United States Patent Office 3,506,445
Patented Apr. 14, 1970

3,506,445
SYNTHETIC FILM MATERIALS
Terence A. Abbott, Margaret L. Clachan, Basil R. Shephard, and David R. Kennedy, Brantham, Manningtree, England, assignors to Bexford Limited, Brantham, Manningtree, England, a British company
No Drawing. Filed Dec. 6, 1965, Ser. No. 511,980
Claims priority, application Great Britain, Dec. 9, 1964, 50,118/64
Int. Cl. G03c 1/78
U.S. Cl. 96—87                                14 Claims

ABSTRACT OF THE DISCLOSURE

A film base material consisting of a film of synthetic linear polyester or polycarbonate of highly hydrophobic character having superimposed thereon a layer adherent to said film, which consists predominantly of a polymeric substance selected from the class consisting of the homopolymers of vinyl halogenoester and vinyl cyanoester and the copolymers thereof with alpha-beta unsaturated carboxylic acids, benzylacetate and vinyl alcohol. A process for making the film base material is also disclosed.

---

This invention relates to synthetic film materials, and more particularly to film base materials of use in the production of photographic materials.

It is known that self-supporting films formed of synthetic linear hydrophobic materials, particularly of the polyesters formed by reaction of ethylene glycol and terephthalic acid, and synthetic polycarbonates, may be prepared with mechanical and physical and chemical properties which, for example, render them very suitable indeed as base materials on which may be coated silver halide photographic emulsion layers for the production of photographic film materials.

However, since such base materials are inherently highly hydrophobic and the usual gelatino silver halide emulsions are highly hydrophilic, there is great difficulty in securing adequate anchorage between the base film and the emulsion layer, especially bearing in mind that the anchorage must remain firm throughout the processing sequence of the final photographic film.

It is known to deal with such a difficulty by the provision of an anchoring layer or layers (so-called "subbing" layers) between the film base and the emulsion layer, and it is an object of the present invention to provide a new method of subbing synthetic linear polyester and polycarbonate film base to render it adapted to accept, and hold strongly adherent to it, a layer of a more hydrophilic nature, e.g. one having a basis of gelatin, such as a gelatino silver halide emulsion layer.

According to a first feature of the present invention there is provided a film base material consisting of a film of synthetic linear polyester or polycarbonate of highly hydrophobic character having superimposed thereon a layer adherent to said film, hereinafter referred to as layer A, which consists predominantly of a polyvinyl halogenoester, or a polyvinyl-cyanoester, or a copolymer of a vinyl-halogenoester or a vinyl-cyanoester with an alpha-beta unsaturated carboxylic acid or with vinyl acetate and/or vinyl alcohol.

The preferred polyvinyl-halogeno-esters for use in layer A are homopolymers of vinyl mono-, di- or tri-halogeno acetate, especially vinyl mono-, di- or tri-chloroacetate, and polyvinyl monocyanoacetate.

The preferred copolymers for use in layer A are co-polymers of vinyl mono, di or tri-halogeno-acetate, especially vinyl mono-, di- or tri-chloracetate of vinylmonocyano-acetate with 1 to 60 mole percent of an alpha-beta unsaturated carboxylic acid such as crotonic acid, or with 1 to 60 mole percent of vinylacetate and/or vinyl alcohol.

The homo-polymers of the class defined above may be readily prepared by polymerisation of vinyl mono-, di- or tri-halogeno-acetate or vinyl mono-cyano-acetate monomer, or alternatively by the complete halogeno-acetylation or cyano-acetylation of polyvinyl alcohol. The copolymers with alpha-beta unsaturated carboxylic acids may be prepared by copolymerisation of vinyl mono-, di- or tri-halogeno acetate or vinyl mono-cyano-acetate monomer with an alpha-beta unsaturated carboxylic acid. The copolymers with vinyl acetate and/or vinyl alcohol may be prepared by copolymerisation of vinyl mono, di- or tri-halogeno acetate or vinyl mono-cyano-acetate with vinyl acetate optionally with subsequent partial hydrolysis to introduce free hydroxyl groups; alternatively these copolymers may be prepared by direct halogeno-acetylation or cyano-acetylation of suitable starting materials such as commercial polyvinyl acetates or polyvinyl alcohols.

A valuable property of the copolymers as defined for layer A is their ability to be readily cross-linked so that the effect of solvents and temperature on the final products is minimal. Suitable cross-linking agents include tetraalkoxy titanium compounds, tetra-alkoxy zirconium compounds, formaldehyde liberators such as para-formaldehyde, dimethylol urea and hexa-methoxymethyl melamine, and di-isocyanates and di-anhydrides. These cross-linking agents may be added in amounts up to 20% by the weight of the copolymer.

The preferred cross-linking agents for use in the invention are tetraisopropyl-titanate and hexa-methoxy methyl melamine.

A film base material as defined above will accept with good anchorage a more hydrophilic layer such as a layer of gelatin applied from organic solvent dispersion, hereinafter referred to as layer $B_1$, or alternatively gelatin together with one of the copolymers of the type defined above as being used in layer A, applied from organic solvent dispersion, hereinafter referred to as layer $B_2$, or alternatively gelatin together with a polyvinyl acetate applied from organic solvent dispersion, hereinafter referred to as layer $B_3$.

Copolymers within the class defined which are particularly suitable for inclusion together with gelatin to form layer $B_2$ are those which have 30–60 mole percent of structural units derived from an alpha-beta unsaturated carboxylic acid, or 30 to 60 mole percent of structural units derived from vinyl acetate and/or vinyl alcohol.

The copolymers of the defined class when used in layer $B_2$ can be cross-linked in the same way as when they are used in layer A.

Suitable polyvinyl acetates for use in layer $B_3$ are readily available commercialy under the Trademark Mowolith.

A film base material as defined above in which layer A is supercoated with a layer $B_1$, $B_2$ or $B_3$ is particularly adapted to accept and hold adherent to it aqueous based gelatin compositions such as a gelatino-silver-halide emulsion layer. This resultant product is of use as photographic material.

In a further embodiment of the invention in order to obtain the greatest adhesion of an aqueous based gelatin composition to a hydrophobic base material which is coated with a layer A and with a layer $B_1$, $B_2$ or $B_3$ it is preferred that layer A consists predominantly of a copolymer, within the class defined, which has from 10 to 30 mole percent of structural units derived from an alpha-beta unsaturated carboxylic acid or from 10 to 30 mole percent of structural units derived from vinyl acetate and/or vinyl alcohol.

In another embodiment of the invention a film base material as defined above will accept with good anchorage on the surface of layer A a cellulose acetate layer. This cellulose acetate layer may afterwards be hydrolysed on its outer surface and impregnated with a light sensitive diazonium salt, or may be directly impregnated with a light sensitive diazonium salt contained in an attacking solvent medium, to produce a diazotype film material.

In a further embodiment of the invention a film base material as defined above will accept with good anchorage onto the surface of layer A a layer of a polyvinyl acetal which may be directly impregnated by a light-sensitive diazonium salt, contained in an attacking solvent medium, to produce a diazotype film material.

In a still further embodiment of the invention a film base material as defined above will accept with good anchorage on to the surface of layer A a layer of partially hydrolysed polyvinyl acetate which includes a light sensitive diazonium salt or which is subsequently impregnated with such a salt.

In another preferred embodiment of the invention where the film base is a film of a synthetic linear polyester, in order to assist in keying layer A to the hydrophobic film base material the said base material is treated with a substance or mixture of substances having a swelling or solvent action on the base. Any of the known swelling agents or solvents for synthetic linear polyester may be used including chloro-substituted aliphatic acids such as trichloroacetic acid, phenols, chloro-substituted phenols such as mono-, di-, and tri-chlorophenol, and aromatic alcohols. These swelling agents or solvents may be conveniently applied to the base in the form of solutions and the base then heated for a short time at an elevated temperature to remove the solvent media and accelerate the action of the swelling agent on the base.

Alternatively to assist in keying layer A, to synthetic linear polyester base, substances or mixtures of substances having a swelling or solvent action on the base may be included as minor proportions of the solvent media for layer A.

Where it is desired that the final film base products are to be coloured or tinted, dyes or pigments may be included, dissolved or dispersed in any of the layers described above, as appropriate to give the required colour and density. Where the base used is one of a synthetic linear polyester the dyes or pigment may alternatively be included together with the swelling agent in the preliminary treatment of the base.

The film products of this invention may be prepared by successively coating synthetic linear polyester or synthetic linear polycarbonate base with the layers as described above, each layer being dissolved or dispersed in a volatile organic solvent medium and being dried before another is applied.

Layer A may conveniently be applied from solvent media containing lower ketones such as acetone or methyl ethyl ketone, alcohols such as methyl or ethyl alcohol or chlorinated hydrocarbons such as methylene chloride and carbon tetrachloride.

In the case of the synthetic linear polycarbonate base, solvent media which have excessive swelling action on the base such as those containing high proportions of methylene chloride are to be avoided since they may cause distortion of the base. Solvent media which contain high proportions of lower ketones should similarly be avoided since they may cause crazing of the polycarbonate base.

The hydrophilic gelating layers $B_1$, $B_2$ and $B_3$ may be applied from solvent mixtures containing lower alcohols or ketones, the ketones constituting less than 50% of the mixture to avoid excessive swelling action on the preceding layer.

In a modification of the invention there is provided film base material which comprises a film of synthetic linear polyester or synthetic linear polycarbonate having super-imposed thereon a layer directly adherent to said film, hereinafter referred to as layer $A_1$, which comprises a homopolymer of the class hereinbefore defined, in respect of layer A or a copolymer within the class hereinbefore defined with respect to layer A, which contains more than 80 mole percent of vinyl-halogeno acetate or vinyl-cyano acetate and, directly adherent to said layer $A_1$, a layer hereinafter referred to as layer $A_2$ which comprises copolymers within the said defined classes which contain more than 20 mole percent of an alpha-beta unsaturated carboxylic acid or more than 20 mole percent of vinyl acetate and/or vinyl alcohol.

The copolymers as used in said layers $A_1$ and $A_2$ may be cross linked as hereinbefore described and a swelling agent may be employed as hereinbefore described in order to assist keying layer $A_1$, to the hydrophobic film, or the swelling agent may be included in minor proportions of the solvent media for layer $A_1$.

The layers $A_1$ and $A_2$ are prepared as layer A hereinbefore described but it is preferred that the solvent media for layer $A_2$ should contain as small a percentage as possible of lower ketones and other solvents likely to swell the layer $A_1$ excessively and avoid loosening of layer $A_1$ from the hydrophobic film.

The aforesaid modified products, in which layer A is replaced by the super-imposed layers $A_1$ and $A_2$ are found to have particularly valuable properties in terms of the adhesion between the layers of the assembly when the layer $A_2$ is supercoated with a gelatin containing layer $B_1$, $B_2$ or $B_3$ and an aqueous based gelating composition such as a gelatino silver halide emulsion layer.

The following examples will serve to illustrate the invention:

In the following Examples 1–6, biaxially oriented polyester film was used.

EXAMPLE 1

Coat 1

A copolymer containing 88 mole percent vinyl monochloracetate, 11 mole percent vinyl alcohol and 1 mole percent vinyl acetate—2.0 g.
Tetra isopropyl titanate—0.1 ml.
Methylene chloride—100 ml.

Dried for approximately 5 mins. at 60° C.

Coat 2

Gelatin—1.2 g.
Water—5.0 ml.
Acetic acid—1.0 ml.
Methanol—95 ml.

Seasoned for 15 mins. at 105° C.

EXAMPLE 2

Coat 1

A copolymer containing 90 mole percent vinyl monochloracetate and 10 mole percent crotonic acid—2.0 g.
Tetra isopropyl titanate—0.1 ml.
Methylene chloride—100 ml.

Dried for approximately 5 minutes at 30° C.

Coat 2

As for coat 2 in Example 1.

EXAMPLE 3

Coat 1

Polyvinyl monochloracetate—2.0 g.
Methylene chloride—100 ml.

Coating dried for 5 min. at 30° C.

Coat 2

Gelatin—1.0 g.
Water—2.0 ml.
Salicylic acid—0.2 g.
Methanol—50 ml.
Acetone—50 ml.
Ethyl lactate—3.0 ml.
Chromic chloride—0.001 g.
A copolymer containing 55 mole percent vinyl monochloracetate and 45 mole percent vinyl alcohol—1.0 g.

Seasoned for 15 mins. at 105° C.

EXAMPLE 4

Coat 1

Polyvinyl monochloracetate—2.0 g.
Methylene chloride—100 ml.

Coating dried for 2 mins. at 30° C.

Coat 2

A copolymer containing 55 mole percent vinyl monochloracetate and 45 mole percent vinyl alcohol—2.0 g.
Acetone—50 ml.
Methanol—50 ml.
Ethyl lactate—3.0 ml.

Dries for approximately 5 mins. at 30° C.

Coat 3

As for coat 2 in Example 1.
Seasoned for 15 mins. at 105° C.

EXAMPLE 5

Coat 1

A copolymer containing 70 mole percent vinyl monochloracetate and 29 mole percent vinyl alcohol and 1 mole percent vinyl acetate—2.0 g.
Methylene chloride—100 ml.
Trichloracetic acid—2.0 g.
Tetra isopropyl titanate—0.1 ml.

Dried for 5 mins. at 60 C.

Coat 2

As for coat 2 in Example 1.
Seasoned for 15 mins. at 105° C.

EXAMPLE 6

Coat 1

A copolymer containing 65 mole percent vinyl dichloracetate and 35 mole percent vinyl alcohol—2.0 g.
Methylene chloride—100 ml.

Dried for 2 mins. at 60° C.

Coat 2

As for coat 2 in Example 1.
Seasoned for 15 mins. at 105 ° C.

In the following Examples 7 to 10 the biaxially oriented polyester film was first treated with a solution containing:
Trichloracetic acid—5.0 g.
Sodium lauryl sulphate—0.25 g.
Water—100 ml.

and dried for 5 minutes at 60° C. Coatings were then applied as set out in the examples.

EXAMPLE 7

Coat 1

A copolymer containing 50 mole percent vinyl monocyanoacetate, 49 mole percent vinyl alcohol, and 1 mole percent vinyl acetate—2.0 g.
Tetra isopropyl titanate—0.1 ml.
Acetone—99 ml.
Methanol—1.0 ml.

Dried for 5 minutes at 60°.

Coat 2

As for coat 2 in Example 1.
Seasoned for 15 minutes at 105° C.

EXAMPLE 8

Coat 1

A copolymer containing 74 mole percent vinyl monobromacetate, and 25 mole percent vinyl alcohol, and 1 mole percent vinyl acetate—2.0 g.
Methylene chloride—100 ml.

Dried for 5 minutes at 60° C.

Coat 2

As for coat 2 in Example 1.
Seasoned for 15 minutes at 105° C.

EXAMPLE 9

Coat 1

A copolymer containing 85 mole percent vinyl monochloracetate and 15 mole percent crotonic acid—1.0 g.
Tetra-iso-propyl titanate—0.1 ml.
Methyl ethyl ketone—100 ml.
Isopropyl alcohol—1.0 ml.

Coat 2

As for coat 2 in Example 1.
Seasoned for 15 minutes at 105° C.

EXAMPLE 10

Coat 1

A copolymer containing 65 mole percent vinyl monochloracetate, 13 mole percent vinyl alcohol, 22 mole percent vinyl acetate—2.0 g.
Hexa-methoxymethyl melamine—0.1 g.
Acetone—99 ml.
Methanol—1.0 ml.
Ethyl lactate—3.0 ml.

Dried for 2 minutes at 30° C.

Coat 2

As for coat 2 in Example 1.
Seasoned for 15 minutes at 105° C.

EXAMPLE 11

Biaxillary orientated polyester film was treated with the followin solution:
2,4,6-trichlorophenol—3.0 g.
2,4-dichlorphenol—2.0 g.
Methanol—100 ml.

After drying for 5 minutes at 60° C. the following coats were applied:

Coat 1

A copolymer containing 70 mole percent vinyl monochloracetate, 29 mol percent vinyl alcohol, and 1 mole percent vinyl acetate—1.0 g.
Acetone—97 ml.
Ethyl lactate—3.0 ml.

Dried for 5 minutes at 60° C.

Coat 2

As for coat 2 in Example 1.
Seasoned for 15 minutes at 105° C.

EXAMPLE 12

Biaxially oriented polyester film was treated with the following solution:

2,4,6-trichlorphenol—2.5 g.
2,4-dichlorphenol—2.5 g.
Methanol—100 ml.

After drying for 5 mins. at 60° C. the following coats were applied:

Coat 1

A copolymer containing 70 mole percent vinylmonochloracetate, 29 mole percent vinylalcohol, and 1 mole percent vinyl acetate—1.0 g.
Hexamethoxymethyl melamine—0.1 g.
p-Toluene sulphonic acid—0.01 g.
Acetone—97 ml.
Ethyl lactate—3.0 ml.

Dried for 5 minutes at 60° C.

Coat 2

Gelatin—1.4 g.
Polyvinyl acetate (Mowolith)—0.1 g.
Water—5.0 ml.
Acetic acid—1.0 ml.
Methanol—94 ml.
Formaldehyde (40% solution)—0.1 ml.

EXAMPLE 13

To biaxially oriented polyester film were applied the following coats:

Coat 1

A copolymer containing 55 mole percent vinyl monochloracetate, 44 mole percent vinylalcohol, and 1 mole percent vinyl acetate—0.5 g.
2,4,6-trichlorphenol—3.5 g.
2,4-dichlorphenol—3.5 g.
Acetone—100 ml.

Dried for 2 minutes at 90° C.

Coat 2

As in example 12 above.

EXAMPLE 14

Biaxially oriented polyester film was treated with the following solution, which included a blue dye to give a finally prepared film base of uniform blue tint.

2,4,6-trichlorphenol—1.0 g.
2,4-dichlorphenol—1.0 g.
Alizarin pure Blue Base B—0.15 g.
Methyl ethyl ketone—100 ml.

After drying for 2 minutes at 80° C., the following coats were applied:

Coat 1

A copolymer containing 70 mole percent vinyl monochloracetate, 29 mole percent vinyl alcohol, and 1 mole percent vinyl acetate—1.0 g.
Hexa-methoxymethyl melamine—0.1 g.
p-Toluene sulphonic acid—0.01 g.
Methanol—1.0 ml.
Acetone—96.0 ml.
Ethyl lactate—3.0 ml.

Dried for 5 minutes at 60° C.

Coat 2

As for coat 2 in Example 1.
Seasoned for 10 minutes at 100° C.

EXAMPLE 15

In the following example polycarbonate film was coated with:

Coat 1

A copolymer containing 70 mole percent vinyl monochloroacetate, 29 mole percent vinyl alcohol, and 1 mole percent vinyl acetate—1.0 g.
Tetra-isopropyl titanate—0.1 ml.
Acetone—40 ml.
Methanol—60 ml.
Ethyl lactate—3.0 ml.

Dried for 2 minutes at 30° C.

Coat 2

As for coat 2 in Example 1.
Seasoned for 15 minutes at 105° C.

A photographic gelatino silver halide emulsion coating was applied directly on to the top coating of the film products of Examples 1–11 and 14 and 15. The layers were strongly adherent to one another and to the film support, so that the final photographic film could be processed without danger of separation of the layers or frilling.

EXAMPLE 16

Biaxially oriented polyester film was pretreated and a first coat applied as in Example 11.

A subsequent coating of secondary cellulose acetate, was applied directly to this first coat, adhered strongly to it and was subjected to alkaline hydrolysis in a manner known per se to provide hydrolysed surface, and this was impregnated with a solution of a light sensitive diazonium compound to yield as end product a light sensitive film for diazo type printing.

EXAMPLE 17

Biaxially orientated polyester film was pretreated and a first coat applied as in Example 11.

A second coat of hydrolysed polyvinylacetate was applied directly to this first coat and adhered to it. This second coat could contain a light sensitive diazonium compound or could be impregnated with a light sensitive diazonium compound to produce a diazo-type material.

EXAMPLE 18

Biaxially oriented polyester film was pretreated and a first coat applied as in Example 11.

A second coat of a polyvinyl acetal resin was applied directly to this first coat and adhered strongly to it. This second coat could be impregnated directly with a light sensitive diazonium compound contained in a solvent medium having a swelling or solvent action on the polyvinyl acetal, without loss of adhesion of the polyvinyl acetal coat to the polyester film, to produce a diazo-type material.

We claim as our invention:

1. A film base material consisting of a film of synthetic linear polyester or polycarbonate of highly hydrophobic character having superimposed thereon a layer adherent to said film, which consists predominantly of a polymeric substance selected from the class consisting of the homopolymerse of vinyl mono-, di-, and tri-halogenoacetate and vinyl cyanoacetate, and the copolymers thereof with at least one copolymerizing substance selected from the class consisting of alpha-beta unsaturated carboxylic acids, vinyl acetate and vinyl alcohol, the said copolymerizing substance constituting 1 to 60 mole percent of the copolymer.

2. A film base material according to claim 1 which comprises a homopolymer selected from the class consisting of homopolymers of vinyl mono-, di-, and trichloracetate, and of polyvinyl cyano acetate.

3. A film base material according to claim 1 which comprises in said layer a cross-linking agent for the polymer.

4. A film base material according to claim 3 wherein the cross-linking agent is tetra isopropyl titanate or hexa methoxymethyl melamine.

5. A film base material consisting of a film of synthetic linear polyester or polycarbonate of highly hydrophobic character having superimposed thereon a layer adherent to said film, which consists predominantly of a polymeric substance selected from the class consisting of the homopolymers of vinyl mono-, di-, and tri-halogenoacetate and vinyl cyanoacetate, and the copolymers thereof with at least one copolymerizing substance selected from the class consisting of alpha-beta unsaturated carboxylic acids, vinyl acetate and vinyl alcohol, the said copolymerizing substance constituting 1 to 60 mole percent of the copolymer, and having superimposed on the said layer a second layer comprising gelatin applied from organic solvent dispersion.

6. A film base material according to claim 5 wherein and second layer comprises gelatin and at least one polymeric compound which is a polymeric substance as defined in claim 6.

7. A film base material according to claim 5 wherein said second layer comprises gelatin and polyvinyl acetate.

8. A light sensitive film comprising a film base according to claim 5, which has superimposed on the second layer a light sensitive gelatino silver halide emulsion layer.

9. A light-sensitive film comprising a film base as defined in claim 1 having on said layer a superimposed cellulose acetate layer carrying at its surface a light-sensitive diazonium salt.

10. A light-sensitive film comprising a film base as defined in claim 1 having on said layer a superimposed polyvinyl acetal layer carrying at its surface a light-sensitive diazonium salt.

11. A light-sensitive film comprising a film base as defined in claim 1 having on said layer a superimposed layer of partially hydrolysed polyvinyl acetate carrying at its surface a light-sensitive diazonium salt.

12. A process for the production of a film base material consisting of a film of polyethylene terephthalate having superimposed thereon a layer adherent to said film, which consists predominantly of a polymeric substance selected from the class consisting of the homopolymers of vinyl mono-, di-, and tri-halogenoacetate and vinyl cyanoacetate, and the copolymers thereof with at least one copolymerizing substance selected from the class consisting of alpha-beta unsaturated carboxylic acids, vinyl acetate and vinyl alcohol, the said copolymerizing substance constituting 1 to 60 mole percent of the copolymer, wherein the film is treated, at a stage not later than the application of said layer with a chlorinated phenol.

13. A process according to claim 12 wherein the said layer is applied from an organic solvent medium which contains a chlorinated phenol.

14. A process according to claim 12 wherein the chlorinated phenol is applied together with a dye for the film.

References Cited

UNITED STATES PATENTS

| | | | |
|---|---|---|---|
| 1,241,738 | 10/1917 | Klatte et al. | 260—89.1 |
| 2,591,542 | 4/1952 | Harriman | 96—87 |
| 2,792,303 | 5/1957 | Sanders et al. | 96—49 |
| 3,023,101 | 2/1962 | Ossenbrunner et al. | 96—87 |
| 3,025,163 | 3/1962 | Ossenbrunner et al. | 96—87 |

FOREIGN PATENTS

| | | |
|---|---|---|
| 589,197 | 6/1947 | Great Britain. |
| 732,607 | 6/1955 | Great Britain. |
| 865,680 | 4/1961 | Great Britain. |
| 910,038 | 11/1962 | Great Britain. |
| 1,366,532 | 6/1964 | France. |

NORMAN G. TORCHIN, Primary Examiner

W. H. LOUIE, JR., Assistant Examiner

U.S. Cl. X.R.

117—34, 76, 138.8, 38